Dec. 23, 1941.  A. D. MACLACHLAN  2,267,530

HOSE

Filed Oct. 19, 1939

Inventor
Andrew D. Maclachlan
By Willis F. Avery
Atty.

Patented Dec. 23, 1941

2,267,530

UNITED STATES PATENT OFFICE 2,267,530

HOSE

Andrew D. Maclachlan, Akron, Ohio, assignor to The B. F. Goodrich Company, New York, N. Y., a corporation of New York Application October 19, 1939, Serial No. 300,190

2 Claims. (Cl. 138—55)

This invention relates to hose and especially to hose of rubber-like material comprising a reinforcement of wrapped convolutions of fabric or the like. I have found that when such hose as constructed heretofore has been subjected to internal fluid pressure to the bursting point, the place of rupture of the hose wall almost invariably has been at the position of the edge of the fabric at the start of the innermost convolution. The hose has been ruptured at this position rather than at some other position along its wall apparently because of the shearing action of this edge of the fabric which is caused to bite into the overlying convolutions upon subjecting the hose to bursting pressure. Apparently the elements of the fabric at this position have been so distorted and strained under this shearing action that this has become the weakest part of the hose wall.

While the bursting strength of the hose can be increased by increasing the number of convolutions of the reinforcement or providing a heavier reinforcement, these expedients are not always practicable owing to dimensional limitations, wear considerations, flexibility requirements and cost.

The chief objects of the invention are to provide increased bursting strength with a minimum of added reinforcing material, to provide high bursting strength with light reinforcement, and to provide for convenience of manufacture.

These and further objects will appear from the following description, reference being had to the accompanying drawing, in which.

Figure 1:
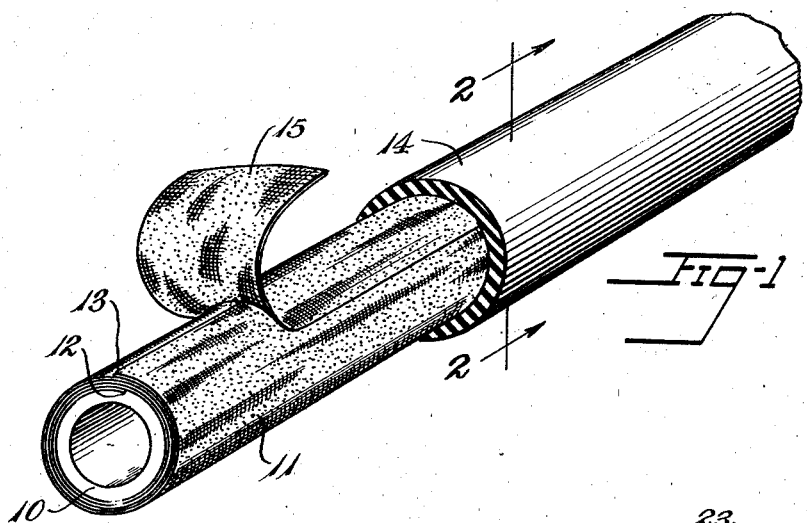
Fig. 1 is a perspective view of a section of hose having been constructed according to and embodying the invention, part of the covering of the hose being removed and part of the outer reinforcing strip being turned back to illustrate the construction.
Figure 2:
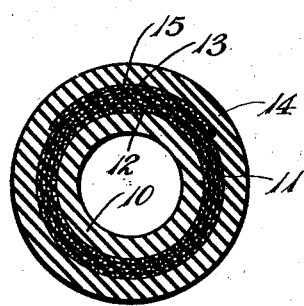
Fig. 2 is a cross-sectional view of the hose taken on line 2—2 of Fig. 1.

Referring to the embodiment of Figs. 1 and 2 of the drawing, the numeral 10 designates the inner tube or lining of the hose formed of a composition of rubber or similar rubber-like material having the desired resistance to penetration of water or other fluid which the hose is to convey. The numeral 11 designates the body of the hose and is formed of square-woven or bias-laid or other suitable fabric wound in a plurality of convolutions about the lining, the winding starting at the position 12 and ending preferably at a position 13 somewhat overlapping the position 12, the fabric preferably being of rubberized construction. The numeral 14 designates the protective covering of the hose which is also formed of rubber composition or other rubber-like material having the desired resistance to penetration of moisture and to oxidation and the effects of sunlight, and having the desired flexibility.

The edge 12 at the start of the innermost convolution of the fabric is the position of the hose wall ordinarily subject to rupture upon burst owing to what appears to be a shear action that takes place as hereinabove discussed. I have found that the point of rupture of the hose wall upon burst may be transferred to other parts of the hose wall with an accompanying considerable increase in the bursting strength of the hose by applying locally in the region of the edge 12 a reinforcing strip 15 overlying the edge 12 and preferably also the outer edge 13 of the convolutions, the strip 15 being of a width sufficient to distribute stresses over an appreciable zone in both circumferential directions from the edge 12 and in a disposition immediately overlying the next underlying ply approximately in contact therewith, as shown. I have found that a width of the strip extending one-third of the circumference of the hose, more or less, gives good results.

By the addition of the strip 15 in hose having a body comprising a reinforcement of fabric wound in four convolutions I have found that the bursting strength of the hose has been increased 10 to 25 percent and more even though the reinforcement throughout the remainder of the wall of the hose has not been increased. Apparently the locally added thickness of fabric overlying the edge 12 has the function of serving as a backing during expansion of the hose, which backing immediately overlies the next underlying ply approximately in contact therewith, such that the stresses tending to cause rupture are not localized to result in a shearing action but are distributed over the circumference of the hose.

Figure 3:
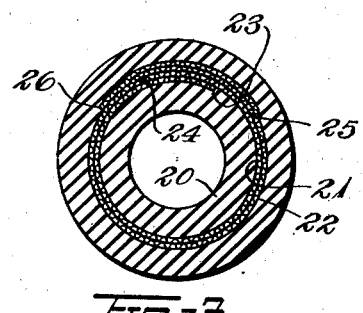
Fig. 3 is a view like Fig. 2, but showing a modified construction.

Referring to the modified construction of Fig. 3, the increased bursting strength of the hose may be obtained also in a construction utilizing two or more wrappings in complete convolutions, the outermost margins of one of the outer convolutions being utilized to provide the extra thickness locally in the region of the edge of the innermost convolution. In Fig. 3 an inner tube 20 has two wrappings 21 and 22 upon it. The innermost edge 23 of the inner convolution 21 is located as shown and the outer edge of that wrapping is disposed as at 24 to provide a slight overlapping. The innermost edge 25 of the outer convolution 22 is started somewhat to the right of the edge 23 as shown and this wrapping is brought around approximately in contact with the first wrapping, as shown, with its outer edge at 26 as shown so as to provide an overlap of the extra material overlying edges 23 and 24. Preferably the wrappings are so arranged that the edge 23 lies approximately midway between the edges 24 and 25 and so that the overlaps provided between the edges 25 and 26 extend through ⅓ of the hose circumference, more or less, to provide effective distribution of the stresses at the edge 23 and also the edge 24 tending to cause rupture of the hose wall. As in the case of the embodiment of Figs. 1 and 2 the hose of Fig. 3 may be provided with a rubber covering as desired.

In the construction of Fig. 3 as well as in the construction first described the only added material is that overlying the edges of the convolutions, and in each case it will be seen that the added material provides an additional thickness of the wrapping only in that region, the remainder of the hose wall being unchanged as to thickness.

The fabric of the reinforcing wrappings may be straight laid with respect to the hose so that its warp and filler threads extend lengthwise and circumferentially, respectively of the hose, or the fabric may be bias-laid with respect to the longitudinal direction of the hose, as desired.

In manufacturing such hose a convenient method of manufacture is to extrude the rubber lining and mount it upon a mandrel or forming pole. The fabric comprising the body 11 may then be wound over the outer surface of the inner tube by use of an ordinary hose wrapping machine. The reinforcing strip 15 of rubberized fabric in the construction of Figs. 1 and 2, or the second wrapping in Fig. 3 is then applied over the trailing ends of the fabric comprising the hose body and is cemented and rolled into place. The covering 14 of rubber-like material may then be wrapped about the fabric in sheet form or may be otherwise placed thereon. The hose may then be wrapped in a removable jacket of fabric and cross-wrapped with a helical winding of narrow rag material, and the hose may then be subjected to vulcanization by being placed in a vulcanizer and surrounded by steam under pressure to provide the desired pressure and temperature.

Variations may be made without departing from the scope of the invention as it is defined by the following claims.

I claim:

1. A hose having a body comprising rubber-like material, a sheet of reinforcing material wound upon itself with its outermost margin overlapping its innermost margin, and a second sheet of reinforcing material wound thereover with its outermost margin overlapping its innermost margin and approximately in contact with the next underlying ply and with the greater thickness of its overlapping marginal zone overlying the innermost edge of the first said sheet to provide an extra backing thickness of the reinforcing material outwardly of such innermost edge as compared with other parts of the hose wall.

2. A hose having a body comprising rubber-like material, a sheet of reinforcing material wound upon itself with its outermost margin overlapping its innermost margin, and a second sheet of reinforcing material wound thereover with its outermost margin overlapping its innermost margin and approximately in contact with the next underlying ply and with the greater thickness of its overlapping marginal zone overlying the innermost and outermost edges of the first said sheet to provide an extra backing thickness of the reinforcing material outwardly of said edges as compared with other parts of the hose wall.

ANDREW D. MACLACHLAN.